Henry D. Keith and John T. Keith's Improved Wagon Wheel.

117300  PATENTED JUL. 25 1871

Witnesses,
W. B. Raymond
H. A. Daniels

Henry D. Keith
John T. Keith
} Inventors,
by C. S. Whitman Attorney
529 Seventh St.
Washington D.C.

UNITED STATES PATENT OFFICE.

HENRY D. KEITH AND JOHN T. KEITH, OF MANSFIELD, OHIO.

IMPROVEMENT IN WAGON-WHEELS.

Specification forming part of Letters Patent No. 117,300, dated July 25, 1871.

*To all whom it may concern:*

Be it known that we, HENRY D. KEITH and JOHN T. KEITH, of Mansfield, in the county of Richland and in the State of Ohio, have invented an Improved Wagon-Wheel; and do hereby declare that the following description, taken in connection with the accompanying drawing hereinafter referred to, forms a full and exact specification of the same, wherein we have set forth the nature and principles of our said improvement, by which our invention may be distinguished from others of a similar class, together with such parts as we claim and desire to secure by Letters Patent.

Our invention relates to that class of wheels which is used on ordinary vehicles; and the nature thereof consists in certain modifications and improvements in the details of the construction of the same, hereinafter described and shown.

Figure 1:
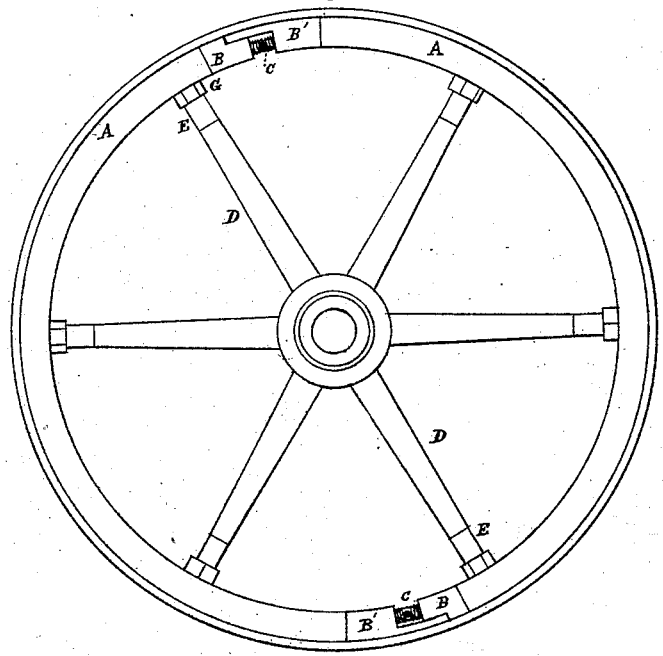
Figure 2:
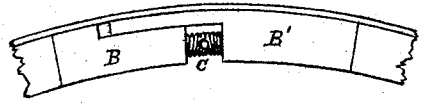
Figure 3:
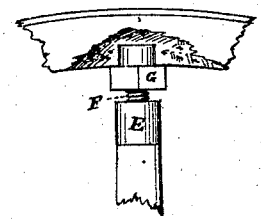

In the accompanying drawing which illustrates our invention and forms a part of this specification, Figure 1 is an elevation of an ordinary wheel with our invention applied thereto. Figs. 2 and 3 illustrate more in detail the construction and arrangement of the tightening-screws.

The construction, operation, and arrangement of our invention are described as follows: At the extremities of the fellies A are the nuts B and B', of the form more particularly shown in Fig. 2, the one overlapping the other. Between and operating with the said nuts are the double-threaded screws C, by means of which the said fellies are forced apart or made to approach each other, as may be desired, when it is necessary to fit the wheel to any particular tire. Fitted to the ends of the spokes D are the cylindrical ferrules E, terminating in the screws F, upon which are the nuts G, which revolve in circular apertures cut in the fellies.

It is obvious, from an inspection of this arrangement of the fellies and spokes, that the diameter of the wheel may at any time be increased or diminished in any given direction with the greatest facility, when it is desirable so to do to save the cost and trouble of cutting the tire or for the purpose of repairs.

Having thus described the construction and advantages of our invention, we will indicate in the following clause what we claim and desire to secure by Letters Patent.

We claim—

A wheel for vehicles, consisting of the fellies A, nuts B B', double-threaded screws C, spokes D, ferrules E, and nuts G, all constructed and arranged as described.

In testimony that we claim the foregoing we have hereunto set our hands and seals this 15th day of April, 1871.

HENRY D. KEITH. [L. S.]
JOHN T. KEITH. [L. S.]

Witnesses:
GEO. W. YOUNGBLOOD,
I. SHUNK.